United States Patent [19]

Dalton, Jr. et al.

[11] 4,329,321

[45] May 11, 1982

[54] METHOD FOR THE RECOVERY OF SALTS OF GROUP VIII NOBLE METALS FROM SOLUTIONS

[75] Inventors: Augustine I. Dalton, Jr.; Ronald W. Skinner, both of Allentown, Pa.

[73] Assignee: Air Products and Chemicals, Inc., Allentown, Pa.

[21] Appl. No.: 195,972

[22] Filed: Oct. 10, 1980

[51] Int. Cl.$^3$ ............................................. C01G 55/00
[52] U.S. Cl. .................................. 423/22; 75/101 BE
[58] Field of Search ............................ 423/22, 658.5; 75/101 BE

[56] References Cited

U.S. PATENT DOCUMENTS

| | | | |
|---|---|---|---|
| 3,138,560 | 6/1964 | Keith et al. | 252/447 |
| 3,294,483 | 12/1966 | Hirschberg | 423/22 |
| 3,336,112 | 8/1967 | Hooper | 423/584 |
| 3,361,533 | 1/1968 | Hooper | 423/584 |
| 3,469,971 | 9/1969 | Leopard | 423/22 |
| 3,694,370 | 9/1972 | Panesko | 252/301.1 R |
| 3,848,048 | 11/1974 | Moore | 423/22 |
| 3,922,231 | 11/1975 | Carlin et al. | 252/301.1 W |
| 3,978,148 | 8/1976 | Citron | 423/22 |
| 4,131,640 | 12/1978 | Kutepow et al. | 423/22 |
| 4,136,059 | 1/1979 | Jalan et al. | 252/447 |

FOREIGN PATENT DOCUMENTS

| | | | |
|---|---|---|---|
| 50-49189 | 5/1975 | Japan | 423/22 |
| 50-49190 | 5/1975 | Japan | 423/22 |
| 813202 | 5/1959 | United Kingdom | 423/22 |

*Primary Examiner*—Herbert T. Carter
*Attorney, Agent, or Firm*—James C. Simmons; E. Eugene Innis

[57] ABSTRACT

Salts of Group VIII noble metals are recovered from neutral or acidic solutions by admixing with the solution up to 10% by weight of hydrogen peroxide, adsorbing the salt of the Group VIII noble metal from the peroxide-containing solution on activated carbon and separating activated carbon containing the adsorbed Group VIII noble metal salts from solution diminished in concentration thereof.

10 Claims, No Drawings

METHOD FOR THE RECOVERY OF SALTS OF GROUP VIII NOBLE METALS FROM SOLUTIONS

BACKGROUND OF THE INVENTION

1. Field of the Invention

This invention relates to the recovery of Group VIII noble metals, more particularly of palladium, from dilute aqueous solutions thereof.

2. Prior Art

It has been proposed by Hirschberg, in U.S. Pat. No. 3,294,483, that palladium can be recovered from dilute acidic palladium-containing solutions by treating the solutions with gaseous hydrogen in the presence of palladinated or platinized carriers, such as carbon black, so as to precipitate metallic palladium on the carrier. It is further proposed that the metallic palladium thus precipitated can be recovered in the form of a concentrated solution by treating the palladium-coated carrier with an oxidizing acid or with a combination of a non-oxidizing acid and an oxidizing agent, for example, hydrogen peroxide, oxygen or air.

It has been proposed by Keith et al in U.S. Pat. No. 3,138,560, to produce palladium on carbon catalysts, under neutral, but preferably alkaline, conditions, using relatively high concentrations of palladium salt in the presence of an oxidizing agent, such as hydrogen peroxide. The carbon black employed is said to have pH greater than about 4.5, preferably greater than about 7, in an aqueous dispersion.

It has been proposed by Panesko, in U.S. Pat. No. 3,694,370, that palladium can be recovered from an alkaline medium containing a mixture of palladium, rhodium and technetium by treatment with activated charcoal, which selectively adsorbs palladium before either rhodium or technetium.

A technique for the separation of technetium, palladium, rhodium and ruthenium proposed by Moore, in U.S. Pat. No. 3,848,048, requires the use of a sequence of carbon beds, on the first of which is adsorbed a high level of a chelating agent specific for palladium, on the second of which is adsorbed a chelating agent specific for technetium and on the third of which is adsorbed a chelating agent specific for rhodium and ruthenium.

Leopard, in U.S. Pat. No. 3,469,971, has proposed recovery of a Pt-group metal from a deactivated catalyst, having a refractory inorganic oxide support, by heating the acid-treated residue of the catalyst with carbon in an oxygen-free atmosphere, heating the resulting material in a medium containing free oxygen, and dissolving iron impurities with a strong mineral acid to produce the Pt-group metal.

Carlin et al, U.S. Pat. No. 3,922,231, is representative of references disclosing the use of ion-exchange resins for the recovery of palladium, rhodium and technetium from alkaline waste solutions.

It will be apparent that the prior art broadly discloses the use of carbon or treated carbon for adsorption of one or more of the Group VIII noble metals from their solutions, but that the processes disclosed are either complex, time-consuming or require the use of expensive reagents during the adsorption step. None of the prior art successfully addresses the problem of recovering Group VIII noble metals from very dilute solutions.

It is an object of this invention to provide a simple process for the efficient removal of low concentrations of palladium or other Group VIII noble metals from dilute acidic or neutral solutions.

SUMMARY OF THE INVENTION

Salts of Group VIII noble metals are removed from a dilute acidic or neutral solution by adding to the dilute solution up to 10% by weight of hydrogen peroxide; contacting the resulting solution with activated carbon upon which the salt is adsorbed; and separating activated carbon and adsorbed salt from solution of diminished salt concentration. Preferably, the Group VIII noble metal salt is palladium and the solution is acidic aqueous or methanolic.

DETAILED DESCRIPTION

"Group VIII noble metal" as used in the specification and claims, means ruthenium, rhodium, palladium, osmium, iridium or platinum, that is metals of the palladium and platinum sub-groups of Group VIII of the Periodic Table. "Pd-group metal" means ruthenium, rhodium or palladium. The process of this invention is preferably applied to the removal of Pd-group metal salts from solutions thereof, most preferably for the removal of Pd salts.

Group VIII noble metals are widely used in supported catalysts. In many cases, the catalysts are contacted with acidic solutions, which more or less rapidly attack the supported noble metal and cause its dissolution. The resulting acidic solutions of noble metal can not be disposed of directly for economic reasons as well as environmental considerations. It will be understood that the process for recovery of Group VIII noble metals is applicable to any acidic effluent stream resulting from catalyst leaching, including effluents of spent catalyst recovery streams. It is also applicable to recovery of Group VIII noble metal salts from dissolved ores.

A typical process giving rise to dilute acidic solutions of Group VIII noble metal is the synthesis of hydrogen peroxide from hydrogen and oxygen using supported catalysts in an aqueous medium containing an acid and an oxygenated organic compound, such as a ketone, ether or ester. Processes of this sort have been disclosed by Hooper in U.S. Pat. Nos. 3,336,112 and 3,361,533.

A preferred catalyst for hydrogen peroxide synthesis by this route is palladium supported on silica gel, from which the palladium tends to dissolve to a considerable extent in the acidic medium employed.

Solutions from which Group VIII noble metal ions can be recovered can be completely aqueous or water-based solutions containing up to 98% by volume of a miscible organic solvent, including methanol. Recovery of Group VIII noble metal ions from non-aqueous solvent systems is also within the scope of this invention, the amount of water added along with the hydrogen peroxide being negligible for all intents and purposes.

The dilute solutions from which the Group VIII noble metals are recovered may contain one or more strong acids, particularly hydrochloric or sulfuric acid. However, the process of the invention will be applicable to solutions containing other acids, e.g., acetic acid, nitric acid, hydrofluoric acid, hydrobromic acid, orthophosphoric acid or various sulfonic acids. The process of the invention is operable in neutral solutions (pH 7.0) or in solutions at any pH on the acid side of neutrality. In practical terms, an upper limit of acidity is of the order of 0.1–2 M and a lower limit of the acidity is of the order of pH 4.

If the process of this invention is to be carried out on Group VIII noble metal solutions under essentially or relatively neutral conditions (pH from about 4 to 7), it will be preferred to use as adsorbent an activated carbon having acidic sites. Representative of acidic activated carbons are:

| Carbon | Source | Acidic sites (meq./g.) |
|---|---|---|
| PCB 4 × 8 | Pittsburgh | Activated Carbon 0.037 |
| BPL 4 × 8 | " | Activated Carbon 0.097 |
| PCB-LS 4 × 10 | " | Activated Carbon 0.170 |
| Darco-551 | ICI (America) | 0.301 |
| Columbia 3LC - 6/8 | Union Carbide | 0.268 |

Accordingly, it is preferred to employ activated carbon having at least 0.03, preferably at least 0.1 meq/g. of acidic sites for treatment of neutral solutions.

The invention is practiced by adding to the dilute neutral or acidic solution up to 10% by weight of hydrogen peroxide and contacting the solution with activated carbon, upon which Group VIII noble metal ions are adsorbed rapidly. The activated carbon and adsorbed Group VIII noble metal salt can then be separated from the solution, which is thus diminished in Group VIII noble metal ions.

Although Group VIII noble metals or the corresponding ions are adsorbed on activated carbon to some extent, the efficiency is thermodynamically limited at the lower concentrations of metal salts, thereby necessitating high capital investments for equipment. However, it has been found that addition of hydrogen peroxide to the dilute salt solution greatly enhances adsorption of the metal ions on the activated carbon and is critical to providing efficient recovery of the Group VIII noble metal salt from the solutions being treated. The amount of hydrogen peroxide added to the dilute solution will be at least sufficient to provide a 1:1 molar ratio of peroxide to metal. It is to be understood that increasing the ratio of peroxide above unity will increase the rate at which the noble metal can be recovered. Generally, the amount of peroxide will be at least 0.5% by weight.

"Activated carbon" or "charcoal" as used in the specification and claims, means high surface area carbon from various sources, including wood, coconut shells, and bituminous coal. The activated carbons suitable for the purposes of this invention will generally have a surface area of 200–1800 M²/g. Those which are preferred will have a surface area of 800–1200 M²/g.

The amount of activated carbon employed per unit volume of acidic solution being treated will depend on the structure of the activated carbon, particularly surface area and adsorptive capacity, and on the Group VIII noble metal content. The solutions can be contacted with the charcoal in either batch or continuous fashion. For large scale utilization, passage of the metal ion-containing solution over a fixed bed of charcoal will be preferred. In continuous processes, the characteristics of the breakthrough curve for any given activated carbon will be determined empirically, partly as a function of the extent of Group VIII metal recovery desired.

It is proposed that the dissolved Group VIII noble metal salt adsorbed on the charcoal may undergo a chemical reaction with hydrogen peroxide on the surface of the charcoal and that metal may therefore be in the form of an oxide or the free metal, as well as in the form of a salt. The expression "activated carbon on which is adsorbed Group VIII noble metal salt" accordingly includes activated carbon or charcoal on which the corresponding salts, oxides or free metals, or any combination thereof, are adsorbed.

It will be understood that "adsorbed" or "adsorbing", as used in the specification and claims, is not limited to adsorption in the thermodynamic sense, although thermodynamically-controlled adsorption is included. It is intended that the term encompass whatever processes or mechanism by which palladium is, in fact, removed from the solution being treated, for example, palladium-carbon bonding, deposition of microscopic palladium particles on carbon, precipitation of colloidal palladium or ion-exchange.

The charcoal or activated carbon can be separated from solution diminished by Group VIII noble metal by filtration or centrifugation, when a batch process is employed. In a fixed bed process, the bed can be isolated by stopping the flow of noble metal-containing solution. In either case, the noble metal adsorbed on the activated carbon can be isolated by dissolution with an oxidizing acid, e.g., hydrochloric acid or nitric acid, or by ashing the noble metal-activated carbon material.

Another alternative is to convert the noble metal adsorbed on activated carbon to a catalyst for hydrogen peroxide synthesis by treatment with a reducing agent, e.g., hydrogen, sodium formate or hydrazine. Preliminary treatment with an oxidizing acid to bring about partial dissolution of the adsorbed noble metal and effect more uniform distribution of the noble metal on the charcoal can be carried out.

The results obtained by the practice of this invention are unexpected because both ion exchange and activated carbon adsorption are thought to be equilibrium controlled $$M^{X+} \text{(solution)} \rightleftharpoons \cdot M^{X+} \text{(sorbed/exchanged)}$$

Therefore, high salt concentrations have heretofore been required for an efficient removal process. At very dilute concentrations, of the order of less than 0.5%, recovery by exchange or sorption techniques was impractical or uneconomical because large beds of charcoal or resin were required.

Without further elaboration, it is believed that one skilled in the art can, using the preceding description, utilize the present invention to its fullest extent. The following specific embodiments are, therefore, to be construed as merely illustrative and not limitative of the remainder of the disclosure in any way whatsoever.

In the following examples, the temperatures are set forth uncorrected in degrees Celsius. Unless otherwise indicated, all parts and percentages are by weight.

EXAMPLE 1

Completely aqueous solutions were prepared which were 0.1 N in sulfuric acid, 0.01 N in hydrochloric acid and contained 500 ppm of palladium (as $PdCl_2$). One solution contained no hydrogen peroxide; the other contained 5% by weight of hydrogen peroxide.

Aliquots (200 ml) of each solution were maintained at 0° C. To each was added a weighed portion of activated carbon (Calgon PCB 4 × 8). The solutions were agitated in a shaker bath and kept at 0° C. The concentration of $Pd^{++}$ in the solutions at indicated time intervals was determined by atomic adsorption spectroscopy. The following results were obtained.

| Sample Composition: | | | | |
|---|---|---|---|---|
| $H_2O_2$(%) | — | — | 5 | 5 |
| Carbon black (g) | 5 | 10 | 5 | 12 |
| Time (hr) | Palladium Concentration (ppm) | | | |
| 0.5 | 393 | 324 | 48 | 34 |
| 1.0 | 290 | 233 | 26 | 12 |
| 2.0 | 169 | 83 | 5 | 6 |
| 4.0 | — | — | — | — |
| 5.0 | 26 | — | — | — |

EXAMPLE 2

Removal of PD++ from solutions as in Example 1, each containing 5% of hydrogen peroxide, was determined at 24° C. employing 10 g samples of commercially-available activated carbon/200 ml of solution.

Results are given in the table:

| Time (hr) Activated Carbon | 0.5 Pd Conc. (ppm) | 1.0 Pd Conc. (ppm) | 2.0 Pd Conc. (ppm) | 4.0 Pd Conc. (ppm) |
|---|---|---|---|---|
| Columbia 6/8 | 20.6 | 22.4 | 24.8 | 11.0 |
| PCB 4 × 10 | 37.2 | 8.5 | 4.4 | 2.1 |
| DARCO S51 4 × 12 | 69.5 | 36.5 | 17.2 | 7.6 |
| Nuchar 14 × 35 | 43.7 | 16.6 | 15.3 | 7.2 |
| BPL 4 × 8 | 34.7 | 12.3 | 6.2 | 1.7 |
| RB 8 × 30 | 6.6 | 4.6 | 4.1 | — |

Properties of the foregoing samples of activated carbons, as made available by the suppliers, were:

| Carbon | Percent Ash (Max.) % | Surface Area $M^2$/g | Total Pore Vol. cc/g | Pore Diameter Distribution | Activation or Pyrolysis T, °C | Other | Source[1] |
|---|---|---|---|---|---|---|---|
| Nuchar 14 × 35 | — | — | — | — | — | Wood based carbon | A |
| BPL 4 × 8 | 8 | 1050–1150 | 0.70 | 43% 10–20A | 8–900 (steam) | Bituminous coal base | B |
| RB Pulv 8 × 30 | 23 | 1250–1400 | 1.22 | 16% 18–20A 41% 20–100A | 8–900 (steam) | | B |
| PCB-LS-4 × 10 | — | — | — | — | 8–900 (steam) | Low sulfur content PCB | B |
| DARCO-S51 4 × 12 | — | 672 | — | 78% 0–40A | — | Lignite base (or wood) | C |
| Columbia 6/8 | 2 | unknown | — | — | — | | D |

[1] A = Westvaco; B = Pittsburgh Activated Carbons; C = ICI (America); D = Union Carbide

EXAMPLE 3

Methanol solution containing 2% by volume of water and about 250 ppm of palladium (as $PdCl_2$) and which was 0.1 N in sulfuric acid and 0.01 N in hydrochloric acid was prepared. A second solution containing 5% by weight of hydrogen peroxide was prepared.

To each 200 ml aliquot of solution, maintained at 0° C. was added a 10 g portion of PCB activated carbon, as in Example 1. At the end of 4 hours, 10 ppm of palladium remained in the solution containing hydrogen peroxide, whereas the control contained above 60 ppm.

EXAMPLE 4

The relationship between hydrogen peroxide concentration and palladium redeposition was determined in experiments in which about 200 ml of peroxide-containing solution was placed in a borosilicate flask previously passivated toward hydrogen peroxide decomposition by soaking in 7% aqueous hydrogen peroxide solution. The volume of solution was chosen so that the total volume, after addition of $PdCl_2$ (10,000 ppm) solution, was 200 ml. The solutions were kept at room temperature during the experiments. Following addition of $PdCl_2$ solution, the indicated amount of activated carbon (12 × 16 PCB, Pittsburgh Calgon) was added to the unstirred solutions. The time at which the carbon black was added was designated as $T_o$. At times indicated in the following table, samples were withdrawn and placed in passivated sample containers. Analysis for dissolved palladium was as in Example 1. Results were:

| | PPM Dissolved Palladium Time | | | |
|---|---|---|---|---|
| % $H_2O_2$ | 0.5 hr | 1 hr | 2 hr | 4 hr |
| A. Methanol/Water Solution[a] Containing 100 ppm Pd | | | | |
| 5 | 6.06 | 2.21 | 0.86 | 0.80 |
| 3 | 7.73 | 3.50 | 1.69 | 0.99 |
| 2 | 9.44 | 5.07 | 2.20 | 1.18 |
| 1 | 11.01 | 6.16 | 2.44 | 1.32 |
| 0.5 | 12.00 | 8.16 | 4.69 | 1.82 |
| 0 | 19.5 | 20.5 | 18.9 | 16.7 |
| B. Acetone/Water Solution[b] Containing 20 ppm Pd | | | | |
| 5 | 2.27 | 1.70 | 0.95 | 0.46 |
| 3 | 2.59 | 1.99 | 0.97 | 0.53 |
| 2 | 2.45 | 1.90 | 1.45 | 0.55 |
| 1 | 2.65 | 2.43 | 1.46 | 0.74 |
| 0.5 | 3.50 | 2.82 | 1.77 | 0.90 |
| 0 | 5.15 | 4.75 | 5.15 | 4.29 |

[a] 80:20 methanol:water by volume containing 100 ppm of each sodium meta- and pyrophosphates and 0.1 N in sulfuric acid and 0.01 N in hydrochloric acid.
[b] 80:20 acetone:water by volume containing 100 ppm of each of sodium meta- and pyrophosphates and 0.1 N in sulfuric acid and 0.01 N in hydrochloric acid.

What is claimed is:

1. A process for the recovery of a salt of a Group VIII noble metal from a dilute acidic solution of pH less than 4 containing less than about 0.5% of the salt, consisting of the steps of:
    (a) adding to the dilute solution up to about 10% by weight of hydrogen peroxide,
    (b) contacting the resulting peroxide-containing solution with activated carbon and adsorbing on the activated carbon the salt of the Group VIII metal, and
    (c) separating activated carbon on which is adsorbed Group VIII noble metal salt from a product solution containing a lower concentration of Group VIII metal salt than the dilute solution of step (a).

2. The process of claim 1, wherein the Group VIII noble metal is of the Pd-group.

3. The process of claim 2, wherein the Pd-group metal is palladium.

4. The process of claim 1, wherein the dilute acidic solution is aqueous.

5. The process of claim 1, wherein the dilute acidic solution is methanolic.

6. The process of claim 3, wherein the Pd-group metal is palladium and the dilute acidic solution is aqueous.

7. The process of claim 3, wherein the Pd-group metal is palladium and the dilute acidic solution is methanolic.

8. The process of claim 1, including a further step of isolating Group VIII noble metal from the activated carbon separated in step (c).

9. The process of claim 1, wherein the dilute solution initially contains 500 ppm or less of Group VIII noble metal.

10. The process of claim 1, wherein the dilute acidic solution is of the order of 0.1-2 M.

* * * * *